US006792925B2

(12) United States Patent
Dworatzek et al.

(10) Patent No.: US 6,792,925 B2
(45) Date of Patent: Sep. 21, 2004

(54) FILTER DEVICE

(75) Inventors: Klemens Dworatzek, Edingen (DE); Karlheinz Muenkel, Oberderdingen-Flehingen (DE); Marion Hartmann, Hockenheim (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/619,552

(22) Filed: Jul. 16, 2003

(65) Prior Publication Data

US 2004/0112348 A1 Jun. 17, 2004

(30) Foreign Application Priority Data

Jul. 16, 2002 (DE) .......................................... 102 32 043

(51) Int. Cl.[7] .............................................. F02M 25/06
(52) U.S. Cl. ..................................... 123/573; 55/385.3
(58) Field of Search ................................ 123/572–574, 123/41.86; 55/330, 385.3, 498, 502

(56) References Cited

U.S. PATENT DOCUMENTS

| 3,160,487 | A |   | 12/1964 | Risse et al. .................... 55/417 |
| 4,011,848 | A | * | 3/1977  | Coddington ................ 137/469 |
| 4,409,950 | A | * | 10/1983 | Goldberg ..................... 123/573 |
| 4,579,092 | A |   | 4/1986  | Kandler .................... 123/41.86 |
| 5,564,401 | A | * | 10/1996 | Dickson ..................... 123/573 |
| 5,579,744 | A | * | 12/1996 | Trefz .......................... 123/573 |
| 6,213,143 | B1 | * | 4/2001 | Schwegler et al. .... 137/115.27 |
| 6,290,739 | B1 |   | 9/2001 | Gieseke et al. ................ 55/330 |
| 6,422,224 | B1 | * | 7/2002 | Walker, Jr. ................... 123/572 |
| 6,640,792 | B2 | * | 11/2003 | Harvey et al. ............... 123/572 |
| 6,709,477 | B1 | * | 3/2004 | Håkansson et al. ........... 55/401 |
| 2001/0054418 | A1 |   | 12/2001 | Burgess ....................... 123/572 |
| 2002/0088212 | A1 |   | 7/2002 | Ernst et al. ................ 55/385.3 |
| 2003/0051455 | A1 |   | 3/2003 | Gieseke et al. ............... 55/482 |

FOREIGN PATENT DOCUMENTS

| DE | 383605      | 10/1923 |
| DE | 10046494 A1 | 7/2001  |
| FR | 2414849     | 8/1979  |

OTHER PUBLICATIONS

Database WPI—Abstract No. XP–002255653 of SU 861670 A.
European Search Report mailed Oct. 21, 2003.

* cited by examiner

Primary Examiner—Marguerite McMahon
(74) Attorney, Agent, or Firm—Crowell & Moring LLP

(57) ABSTRACT

A filter device having a filter element arranged in a filter housing with a housing port closed by a housing cover with a housing ring. A medium to be purified is supplied to the filter element through an inlet in the filter housing. On the discharge side of the filter element, purified medium is discharged through an outlet in the filter housing. A pressure relief valve is integrated into the housing cover and is subjected to the pressure on the inlet side of the filter element. The housing cover is constructed in two parts and includes an inside cover and an outside cover. The pressure relief valve is mounted in the inside cover, which closes the housing port. A discharge path for discharging medium exhausted from the filter housing through the pressure relief valve is formed between the inside cover and the outside cover.

7 Claims, 3 Drawing Sheets

FILTER DEVICE

BACKGROUND OF THE INVENTION

This invention relates to a filter device comprising a filter element arranged in a filter housing that is closed by a housing cover, in which a medium to be filtered is supplied to the filter element through an inlet in the filter housing, and filtered medium is discharged through an outlet in the filter housing on the filtered side of the filter element, and in which a pressure relief valve is integrated into the housing cover and is subjected to the pressure on the inlet side of the filter element. Filter devices according to the invention are particularly suitable for filtering gases vented from the crankcase of an internal combustion engine.

Filter devices for crankcase venting, also known as oil separators, are used for filtering and purifying oil-laden air from the crankcase, the separated oil being recycled back to the oil circuit, and the filtered air being introduced into the intake tract of the internal combustion engine as a rule. The inventive filter device comprises a filter element in a filter housing which is supplied with oil-laden air through an inlet, the purified air being removed through an outlet in the filter housing. For safety reasons, a pressure relief valve is integrated into the housing cover, this valve being acted upon by the pressure of the oncoming flow side, i.e., the raw side, of the filter element and being switched to an open position when a limiting pressure is exceeded in order to relieve the pressure in the filter housing.

Such filter devices usually have a cylindrical shape, and the pressure relief valve is usually positioned in a housing cover on an axial end face of the filter. The pressure relief valve is held in the housing cover and is acted upon in its closed position by a valve spring. As soon as the excess pressure in the filter housing exceeds a value at which the pressure relief valve is opened against the force of the valve spring, the oil-laden air flows out of the filter housing through the valve.

The housing cover is inserted into a housing port on the axial end face of the filter housing and is sealed by a peripheral sealing ring between the inside of the wall of the housing port and the outside of the housing cover. The housing cover is usually screwed into the housing port, a thread being provided for this purpose between the wall of housing port and the housing cover.

If the housing cover is to be removed, e.g., for maintenance purposes, there is the risk that the rotational motion for opening the housing cover might result in damage to the sealing ring, which may be stuck tightly between the two components, in particular after a residence time between the wall of the housing port and the housing cover, so that a relative rotational motion between the filter housing and the housing cover may result in high forces acting on the sealing ring in the peripheral direction, possibly damaging the sealing ring. Likewise, adhesion of the sealing ring may result in a great increase in the force which must be exerted to open the housing cover.

SUMMARY OF THE INVENTION

It is an object of the invention to provide an improved filter device, particularly one suitable for filtering crankcase vent gases from a crankcase of an internal combustion engine.

Another object of the invention is to provide a filter device which is invention is based on the problem of creating a filter device having a simple construction and including a pressure relief valve.

A further object of the invention is to provide a filter device with a pressure relief valve in a housing cover, where the valve is protected from contamination and/or damage.

An additional object of the invention is to provide a filter device with a pressure relief valve which reliably prevents damage or injury from an oncoming flow of a hot gas/oil mixture if the pressure relief valve is opened.

These and other objects are achieved in accordance with the present invention by providing a filter device comprising a filter element disposed in a filter housing having a housing port closed by a housing cover, said filter housing having an inlet for supplying a medium to be purified to an unfiltered side of the filter element and an outlet for discharging purified medium from a filtered side of the filter element, and a pressure relief valve arranged on the housing cover and subjected to a pressure on the unfiltered side of the filter element, wherein the housing cover is constructed in two parts and comprises an inside cover and an outside cover; the pressure relief valve is mounted on the inside cover, the inside cover closes the housing port, and a discharge path is formed between the inside cover and the outside cover for discharging any medium vented from the filter housing through the pressure relief valve.

Further advantageous features and refinements are described hereinafter.

The filter device according to this invention has a two-part housing cover comprising an inside cover and an outside cover, and a pressure relief valve situated in the inside cover. A discharge path is formed between the inside cover and the outside cover for discharging a medium which escapes when the pressure relief valve is opened.

In a first preferred embodiment, the inside cover and the outside cover have different functions. The inside cover is the carrier of the pressure relief valve and also serves to provide a pressure-tight seal of the housing port in the filter housing into which the inside cover is inserted. The outside cover extends over the inside cover including the pressure relief valve and thus protects the valve from contamination from the outside. The outside cover does not have any sealing function, so sealing elements are not required between the housing wall and the outside cover. It is sufficient to provide such sealing elements, in particular a sealing ring, between the inside cover and the wall. In addition to protecting against soiling, the outside cover also provides protection against mechanical damage to the pressure relief valve.

According to another preferred embodiment, the discharge path between the inside cover and the outside cover is formed by the fact that the two covers are situated with a distance between them, so that the discharge path assumes the form of a disk-shaped space between the two covers, the diameter corresponding essentially to that of the inside cover and/or the outside cover. In another alternative embodiment, however, it may also be advantageous to arrange the inside cover and the outside cover with one directly on the other and to provide discharge paths between the outlet of the pressure relief valve in the inside cover and the environment, e.g., in the form of grooves which are created in the inside cover and/or the outside cover.

The discharge path between the inside cover and the outside cover offers the additional advantage that the pulse of the fluid escaping in the discharge path when the pressure relief valve is opened is weakened, so that the fluid escaping from the filter device produces little or no pressure surge when discharged into the environment. The velocity of flow of the fluid is reduced significantly in the discharge path.

The outside cover is advantageously connected to the wall of the housing port by a securing device, whereby the securing device allows adequate flow paths for discharging the medium into the environment. These flow paths may be designed, e.g., as recesses in a mounting thread between the outside cover and the wall surrounding the housing port.

In yet another advantageous embodiment, the inside cover and the outside cover are connected by a latched connection which has the advantage that it makes it possible in principle to omit a connection between the inside cover and the wall of the housing port, and the inside cover is secured axially only by the latching device between the inside cover and the outside cover. Axial forces acting on the inside cover are transmitted via the latching device to the outside cover and are also transmitted from the outside cover to the wall of the housing port via the securing device. In this embodiment, the outside cover, in addition to its protective function, also assumes the function of axially securing the inside cover.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figure 1:
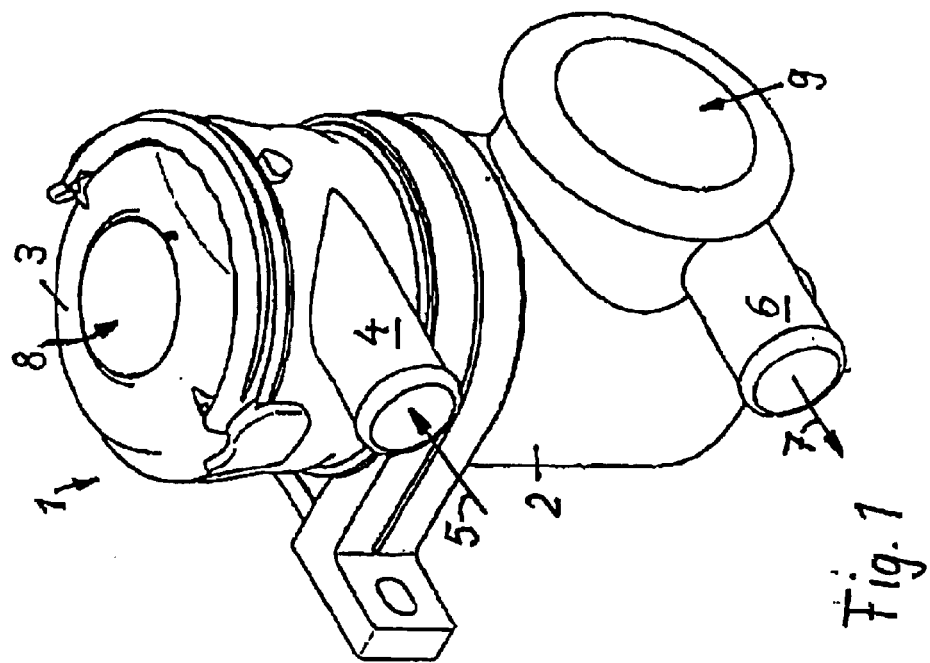
FIG. 1 is a perspective view of a filter device having a housing cover with a pressure relief valve provided therein.

The filter device 1 shown in FIG. 1 has a filter element through which a medium that is to be purified is to flow in an approximately cylindrical housing 2 which is closed by a removable housing cover 3, whereby the medium to be purified can be introduced into the interior of the filter device in the direction of the arrow 5 through an intake 4 located on the side of the filter housing 2, and after successful cleaning of the medium, it is discharged in the direction of the arrow 7 through an outlet 6 located on the side. The medium to be purified may be a gas or a liquid. According to a preferred embodiment, the filter device 1 is designed as an oil separator in which oil droplets are separated from an oil-air mixture, which is formed, e.g., in the crankcase of an internal combustion engine, with the purified air being discharged from the crankcase and sent in particular to an intake duct of the internal combustion engine. However, use in a gas filter or a liquid filter may also be considered.

Figure 2:
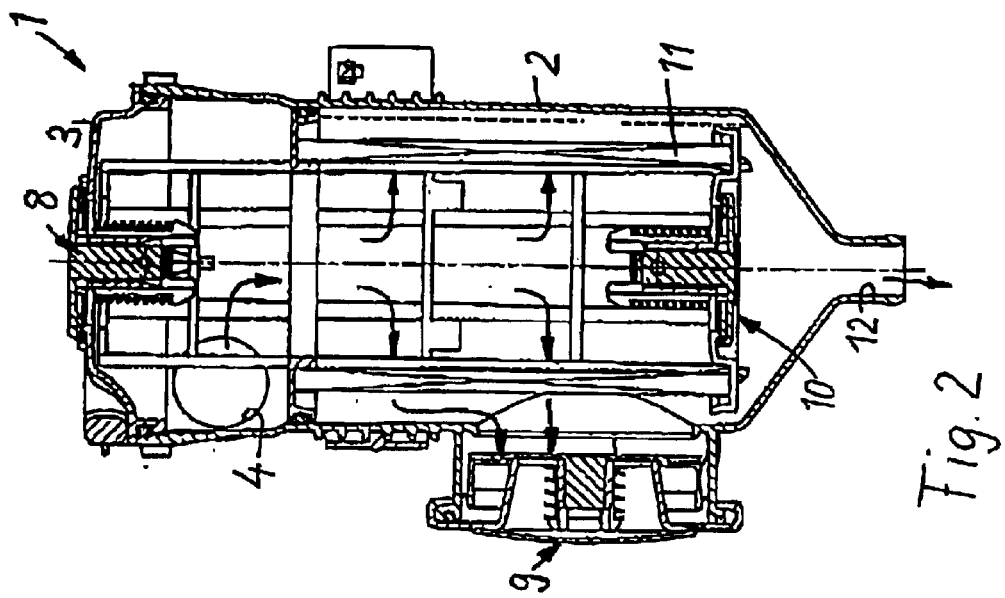
FIG. 2 is a longitudinal sectional view of the filter device of FIG. 1.

As shown by FIG. 1 in combination with FIG. 2, a pressure relief valve 8 is integrated into the housing cover 3, which is situated in the area of an axial end face of the filter housing 2. Pressure relief valve 8 is acted upon by the pressure on the inlet (i.e. unfiltered) side of the filter element; and if an allowed limiting pressure is exceeded, this valve is moves to its open position, so that the medium introduced into the filter housing can exit from the inlet side of the filter, thereby preventing an overload.

Figure 5:
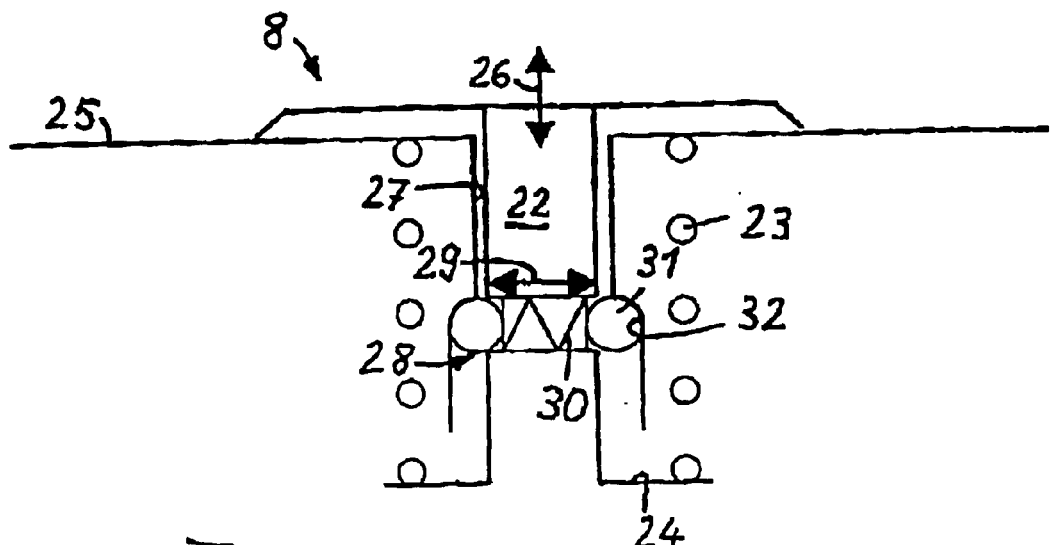
FIG. 5 is a schematic diagram of a pressure relief valve in which the body in the closed position of the valve is acted upon by a clamping device with a clamping force which acts transversely to the direction of displacement of the valve body.

On the clean or filtered side of the filter device, a pressure regulating valve 9 is installed in the area of the outlet channel 6 to prevent the vacuum in the crankcase from becoming excessive. A relatively low partial vacuum varying within a very small pressure range must always prevail in the crankcase. If the vacuum becomes excessively high on the intake manifold side, this would propagate counter to the direction of discharge flow 7 into the filter housing, through the pressure regulating valve 9, which is open in the normal case, and counter to the direction of supply flow 5 into the crankcase. The pressure regulating valve 9 is in the open position when a relative partial vacuum within the desired pressure range prevails on the clean side with respect to the outside of the filter device 1. This is achieved by presetting the pressure regulating valve 9 by means of an appropriate valve spring 23 (FIG. 5). However, if the relative partial vacuum with respect to the pressure on the outside of the filter device 1 exceeds the initial force of the valve spring 23 which acts against this pressure, then the pressure regulating valve will be switched to its closed position.

As also shown by the sectional diagram according to FIG. 2, the medium to be purified is introduced through the intake 4 into the interior of the filter housing 2 in which a cylindrical filter element 11 is situated. The inside of the filter element forms the inlet or unfiltered side, and the fluid to be purified flows radially through the filter element from the inside to the outside. In the case of a separator, the separated oil droplets are flow downwardly toward the bottom on the radial inside of the filter element 11. The purified air passes through the filter element radially from the inside to the outside, is collected in an annular space radially surrounding the filter element 11, and is discharged to the outside in the direction of arrow 7 after passing through the pressure regulating valve 9.

In the bottom area in the interior of the filter element 11, there is a bypass valve 10 which is moved to its open position when a minimum pressure is exceeded, whereupon the separated oil droplets are discharged downward through a conically tapered area of the filter housing 2 and an outlet 12.

Figure 3:
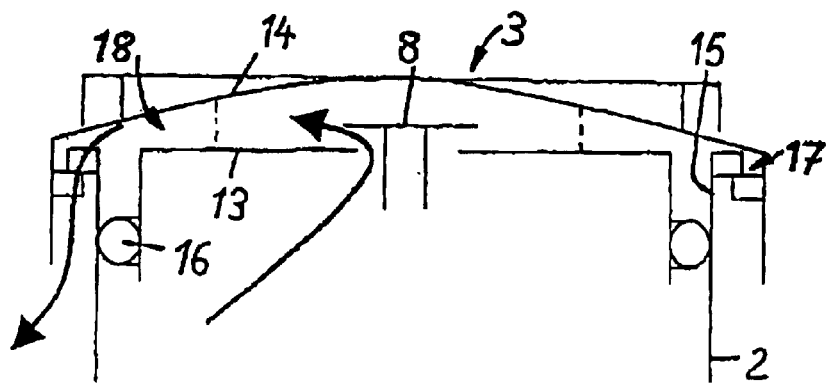
FIG. 3 is a schematic view of a two-part housing cover for a filter device according to the invention.
Figure 4:
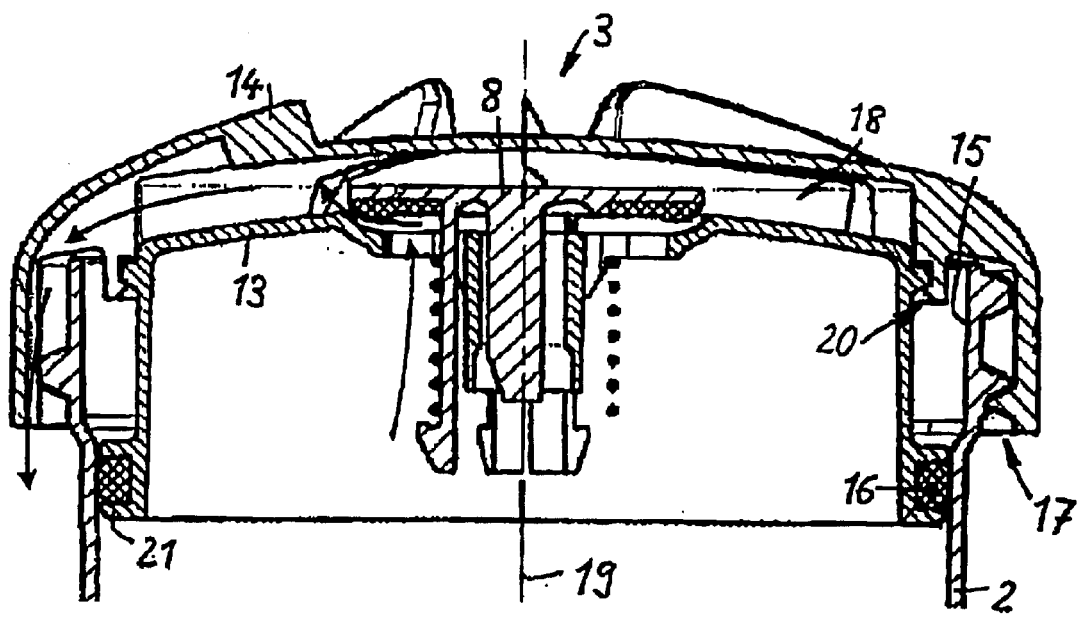
FIG. 4 is a construction diagram of a two-part housing cover for the filter device.

FIGS. 3 and 4 show a housing cover 3 in a modified embodiment. The housing cover 3 is constructed in two parts and includes an inside cover 13 and an outside cover 14. The inside cover 13 is inserted into a housing port 15 on the filter housing 2, with a sealing ring 16 mounted on the outside of the inside cover 13 in sealing contact with the inside wall of the housing port 15. The outside cover 14 is approximately parallel to the inside cover 13 and extends over the housing port 15, so that the inside of a cylindrical wall section of the outside cover 14 is adjacent the outside wall of the housing port 15. The outside cover 14 is connected to the wall of the housing port 15 by a securing device 17, for example threads or a bayonet catch. The inside cover 13 carries the pressure relief valve 8, which in the open position enables a flow path through the inside cover 13 into a discharge path 18 formed between the inside cover 13 and the outside cover 14. The discharge path 18 is created in particular due to the fact that the inside cover 13 and the outside cover 14 are spaced a distance apart, thus forming an approximately plate-shaped flow space which extends essentially over the end face of the inside cover and the outside cover. It may optionally also be advantageous to provide flow grooves in the area of the outside of the inside cover 13 and/or in the area of the inside of the outside cover 14 for any excess pressure which is discharged from the interior of the filter housing 2.

Any medium which flows into the discharge path 18 when the pressure relief valve 8 is opened, is guided radially outwardly, and leaves the flow path 18 between the inside cover 13 and the outside cover 14 through axial flow gaps formed between the outside wall of the housing port 15 and the inside of the cylindrical section of the outside cover 14.

As shown in detail in FIG. 4, the securing device 17, which affixes the outside cover 14 to the outer wall of the housing surrounding housing port 15, is constructed as a mounting thread. The mounting thread has sections having different pitch threads, the section with a lower pitch being situated in an area adjacent to the fully closed position of the outside cover 14, which is formed in FIG. 4 by the lower part of the thread on the outside cover 14. A section having a larger pitch thread is arranged in the area of the axial end face of the housing port. As a result, because of the larger pitch of the thread, a relatively great axial displacement along the longitudinal axis 19 of the filter toward the closed position is achieved initially when the outside cover 14 is placed on the mounting thread at the beginning of the closing movement. In contrast thereto, on reaching the section having a smaller pitch and approaching the fully closed seating position of the outside cover, a more gradual axial displacement of the outside cover is established, so that in the case of manual tightening of the housing cover in particular, more force and/or a more controllable force is available for achieving the seated or closed position.

Axial flow grooves may be formed through the securing threads to permit unobstructed discharge of fluid in the discharge space and/or along the discharge path 18.

In addition to the securing device 17 between the wall of the housing port 15 and the outside cover 14, a latching device 20 is also provided, situated between the inside cover 13 and the outside cover 14 and permitting a form-fitting engagement between the inside cover and the outside cover in the axial direction. The latching device 20 includes one or more latching cams, which are advantageously situated on the exterior peripheral side of the inside cover 13 as well as a latching groove which is formed on the inside jacket of the outside cover 14. The latching device 20 allows a form-fitting connection in the axial direction between the inside cover and the outside cover. The latched position is advantageously reached only on achieving the seated and fully closed position. In addition, to form a bayonet closure in which an axial displacement movement and a rotational movement are executed in succession, it may be advantageous to design the latching cams on the outside of the inside cover 13 so they are not continuous, but instead have spaces between them on the periphery, e.g., by providing three individual latching cams distributed at 120° angles, with suitably constructed latching groove sections on the outer cover associated with the latching cams. The latching device 20 constitutes an additional protection against unintended loosening of the housing cover.

As FIG. 4 also shows, the sealing ring 16 is disposed in a peripheral sealing groove 21 on the outside of the inside cover 13. The division of the housing cover 3 into two separate cover parts offers the advantage of a separation of functions between the inside cover and the outside cover. The inside cover 13 is the carrier of the sealing ring 16, but the outside cover 14 has the function of securing the two cover parts on the filter housing 2 and also protecting the pressure relief valve 8 from contamination. This division of function also offers the advantage that the sealing ring is not twisted when the cover is opened or closed, but instead need only undergo a translatory displacement together with the inside cover 13 in the direction of the longitudinal axis 19. Since the sealing ring 16 may stick to the adjacent inside wall of the housing port 15, in particular after lengthy use in its sealing position, the forces required for a translatory axial removal of the inside cover are lower than would be the case for a rotational motion. This protects the sealing ring and prevents damage upon insertion and removal.

Furthermore, the two-part design for the housing cover 3 offers the advantage that the discharge path 18 in between the covers, through which the excess pressure, which escapes from the interior of the housing when the valve 8 is opened, can be released to the outside, can be manufactured with a less complex construction.

The inside cover 13, the outside cover 14, the securing device 17 and the latching device 20 may each be made of molded synthetic resin material (e.g., plastic).

FIG. 5 shows a specific embodiment of a pressure relief valve 8. The pressure relief valve 8 comprises a valve body 22, which is moved axially in a valve body guide 27 in the movement direction indicated by arrow 26 between the closed position shown in FIG. 5 and an open, raised position. Valve body guide 27 is constructed in a housing part 25. Valve body 22 is acted upon by a valve spring 23, which urges the valve body 22 into its closed position. Spring 23 is supported on a valve disk 24 that is fixedly connected to the valve body 22. When subjected to an excess pressure which acts in the interior of the housing and exceeds the closing force of the valve spring 23, the valve body 22 is moved into its open position so the excess pressure can escape.

To influence the spring characteristic and thus the opening and/or closing behavior of the valve 8, the valve is provided with a clamping device 28, which applies a clamping force to the valve body 22. This clamping force acts in a radial direction in accordance with arrow 29 transversely to the direction 26 of movement of the valve body 22 and securely clamps the valve body 22 in the valve body guide 27. The clamping device 28 is fixedly connected to the valve body 22 and includes an additional spring 30 which is constructed in particular as a compression spring and whose spring action acts in the direction indicated by arrow 29. The additional spring 30 is connected at both its axial end faces to latching balls 31. The latching balls 31 are urged radially outwardly by the force of the additional spring 30 and pressed with a clamping force into the latching recesses 32 which are formed in the inside wall of the valve body guide 27 and advantageously are adapted to the shape of the latching balls 31. The clamping device 28 is in its engaged position when the valve body 22 is in the closed position, so that a greater excess pressure is necessary for moving the pressure relief valve 8 to the open position than is required in embodiments without the clamping device 28. The level of additional pressure required to release the clamping device 28 and to move the valve to the open position can be influenced by appropriate selection of the force of the additional spring 30, the geometry of the latching elements 31 acted upon by the additional spring 30, and the geometry of the latching recesses 32.

After reaching the limiting pressure above which the valve is moved into the open position, because of the axial adjusting movement of the valve body toward the open position, the latching balls 31 initially are urged radially inward against the force of the additional spring 30. As the opening movement continues, the latching balls contact the inside wall of the valve body guide 27. The clamping force which is exerted by the clamping device 28 on the inside wall of the valve body guide 27 in the switching section between the closed position and the open position is significantly lower than the clamping force in the closed position of the valve, because in the closed position, the clamping device assumes a form-fitting engaged position, but in the intermediate switching section, it only glides along the inside wall. In addition, it should be taken into account that initially a greater static friction must be overcome between the latching elements acted upon by the additional spring and the latching recesses in the neutral position of the valve body, whereas when the valve body is moved, only a minor sliding effect is operative between the latching elements which are urged outwardly and the inside wall of the valve body guide.

This sharp decline in the clamping force alters the total spring characteristic and the opening behavior of the valve. In comparison with prior valves known from the state of the art, the valve body is moved from the closed position to the open position at a higher rate of switching, so that the valve may be adjusted rapidly to the open position.

Figure 6:
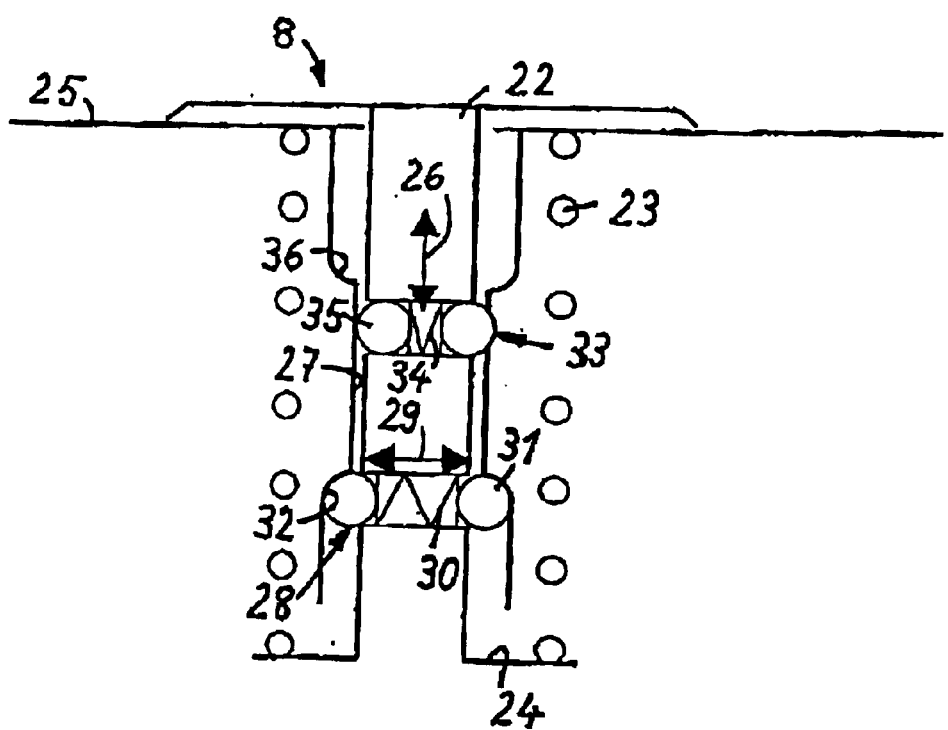
FIG. 6 shows a modified pressure relief valve design having two separately constructed clamping devices which apply a clamping force to the valve body of the pressure relief valve both in its closed position and in its open position.

The illustrative embodiment according to FIG. 6 also shows a pressure relief valve 8, which is in its closed position and is moved axially in the direction indicated by arrow 26 between the closed position and the open position. Like the preceding illustrative embodiment, the valve has a clamping device 28 which act upon the valve body 22 in the closed position with a clamping force which is exerted in the direction of the arrow 29 transversely to the direction of valve body movement indicated by arrow 26. In addition, a second clamping device 33 is also provided, having a design similar to the first clamping device 28 and including a second additional spring 34 and the axial latching balls 35, which are acted upon by the second additional spring 34. In the open position of the valve, the latching balls 35 engage the latching recesses 36, which are formed in the inside wall of the valve body 27. In this way, the valve body 22 is in a latched position in both its closed position and its open position, such that the valve body can be switched from one latched position into the respective opposite end position only with an increased expenditure of force in comparison with an embodiment without the clamping device. In this case, the closing movement of the valve is supported by the force of the valve spring 23. As soon as the excess pressure in the housing interior falls below a limiting value, the force of the valve spring is sufficient to move the valve body 22 axially toward its closed position against the remaining excess pressure in the housing interior and against the clamping force of the second clamping device 33. By analogy with the opening movement, an abrupt closing of the valve can be accomplished with the help of the second clamping device 33, because the clamping force is reduced abruptly as soon as the latching balls 35 of the second clamping device 33 are raised out of their seats in the latching recesses 36.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter device comprising a filter element disposed in a filter housing having a housing port closed by a housing cover, said filter housing having an inlet for supplying a medium to be purified to an unfiltered side of the filter element and an outlet for discharging purified medium from a filtered side of the filter element, and a pressure relief valve arranged on the housing cover and subjected to a pressure on the unfiltered side of the filter element, wherein the housing cover is constructed in two parts and comprises an inside cover and an outside cover; the pressure relief valve is mounted on the inside cover, the inside cover closes the housing port, and a discharge path is formed between the inside cover and the outside cover for discharging any medium vented from the filter housing through the pressure relief valve.

2. A filter device according to claim 1, wherein the inside cover and the outside cover are connected by a latching device.

3. A filter device according to claim 2, wherein the latching device is arranged in a peripheral area between the outside of the inside cover and the inside of the outside cover.

4. A filter device according to claim 2, wherein a plurality of individual latching devices is provided between the inside cover and the outside cover, said latching devices being distributed circumferentially around the covers, and wherein a flow path is formed between adjacent latching devices.

5. A filter device according to claim 1, further comprising a sealing ring provided between the inside cover and a wall of the housing port.

6. A filter device according to claim 1, wherein the outside cover is connected to a wall of the housing port by a securing device.

7. A filter device according to claim 1, wherein the filter inlet is connected to a crankcase vent for a crankcase of an internal combustion engine, and the filter outlet is connected to an air intake tract of the internal combustion engine.

* * * * *